United States Patent [19]
Chancellor

[11] Patent Number: 5,914,041
[45] Date of Patent: Jun. 22, 1999

[54] CHANNEL BASED REVERSE OSMOSIS

[75] Inventor: Dennis H. Chancellor, Woodland Hills, Calif.

[73] Assignee: Nate International, Woodland Hills, Calif.

[21] Appl. No.: 08/925,055

[22] Filed: Sep. 8, 1997

Related U.S. Application Data

[63] Continuation of application No. 08/708,249, Sep. 3, 1996, abandoned.

[51] Int. Cl.$^6$ .................................................. B01D 61/00
[52] U.S. Cl. ................. 210/641; 210/321.8; 210/321.88; 210/652; 210/170; 210/335
[58] Field of Search ............................. 210/652, 321.79, 210/321.8, 321.88, 321.9, 170, 321.63, 195.1, 257.2, 641, 335

[56] References Cited

U.S. PATENT DOCUMENTS

| | | | |
|---|---|---|---|
| 4,125,463 | 11/1978 | Chenoweth | 210/433 |
| 4,352,736 | 10/1982 | Ukai et al. | 210/321.88 |
| 4,911,847 | 3/1990 | Shmidt et al. | 210/650 |
| 5,096,583 | 3/1992 | Roux et al. | 210/321.89 |
| 5,294,346 | 3/1994 | Kaschemekat | 210/321.89 |
| 5,479,469 | 12/1995 | Eckman | 210/321.8 |

*Primary Examiner*—Ana Fortuna
*Attorney, Agent, or Firm*—Crockett & Fish; Robert D. Fish

[57] ABSTRACT

A plurality of reverse osmosis units each having a cavity and a membrane are placed within a deep channel. The channel contains an unpurified liquid, and the membranes communicate directly with the unpurified liquid in the channel. The level of unpurified liquid is such that the differential pressure across the membranes is sufficient to cause purified liquid to accumulate in the cavities, from which it is emptied and pumped to the surface. The high pressure sides of the membranes are flushed by unpurified liquid being pumped through the channel. In this manner, a relatively large percentage of the channel diameter can be utilized, and the mechanisms can be implied over prior systems in which unpurified and purified liquids are piped from one reverse osmosis unit to another.

17 Claims, 8 Drawing Sheets

CHANNEL BASED REVERSE OSMOSIS

This application is a continuation of application Ser. No. 08/708,249 filed Sep. 3, 1996 now abandoned.

FIELD OF THE INVENTION

The present invention relates generally to membrane purification of liquids.

BACKGROUND OF THE INVENTION

Despite numerous advances over the years, there exists a continuing need for improved liquid purification. Many areas of the world, for example, have insufficient fresh water for drinking or agricultural uses, and even where plentiful supplies of fresh water exist, the water is often polluted with chemical or biological contaminants, metal ions and the like. There is also a continuing need for commercial purification of other liquids such as industrial chemicals and food juices. U.S. Pat. No. 4,759,850, for example, discusses the use of reverse osmosis for removing alcohols from hydrocarbons in the additional presence of ethers, and U.S. Pat. No. 4,959,237 discusses the use of reverse osmosis for orange juice.

Many of these needs have been addressed by reverse osmosis, which is the removal of contaminants from a liquid by passing the liquid through a membrane under pressure. As used herein, the term "membrane" refers to the functional membrane unit, which may include one or more semipermeable layers and one or more support layers. Depending on the fineness of the membrane employed, reverse osmosis can remove particles varying in size from the macromolecular to the microscopic, and modern reverse osmosis units are capable of removing particles, bacteria, spores, viruses and even ions such as $Cl^-$ or $Ca^{++}$.

Despite these successes, there are several problems associated with large scale reverse osmosis (RO), including excessive fouling of the membranes and high costs associated with producing the required pressure across the membranes. These two problems are interrelated in that most or all of the known RO units require flushing of the membranes during operation with a relatively large amount of unpurified liquid relative to the amount purified liquid produced. This ratio, often 3:1 or even 5:1, means that if one simply pumps unpurified liquid up to a storage tank and then allows it to flow down through an RO membrane, the amount of purified liquid produced may not justify the costs of pumping so much unpurified liquid.

There have been numerous attempts over the years to overcome these problems. U.S. Pat. No. 5,229,005 to Fok et al, for example, describes lowering a vessel from the side of boat deep into the ocean. The vessel is equipped with an RO membrane on one of its surfaces, and at a depth of about 2250 feet, the ambient pressure is sufficient to force fresh water through the membrane and into the vessel. When the vessel is thus filled with fresh water, it is raised back to the ship and emptied. To increase operating efficiency, the inventor suggests alternately lowering and emptying two such vessels. While the claimed method can be functional, non-continuous nature of the process renders it largely inadequate to supply fresh water on a commercial scale.

Another attempt at overcoming these problems was discussed in U.S. Pat. No. 4,512,886 to Hicks et al. There, an RO module is placed in the ocean at a depth at which the ambient pressure is insufficient to operate the membrane, but at which the ambient pressure combined with additional pressure provided by a pump is sufficient to operate the membrane. Pressurized water is therefore pumped through the RO module utilizing energy from waves overhead, with fresh water coming out one end of the module and "waste brine" being eliminated from the other end. Unfortunately, the mechanism is limited to localities having considerable wave action, and in any event is relatively costly to install and operate.

Still another attempt at overcoming these problems was discussed in U.S. Pat. No. 3,456,802 to Cole et al. In that patent, several RO cells were submerged at a sufficient depth in the ocean, and salt water was fed to the cells through a pipe from the surface. Fresh water output of the cells was then pumped back up to the surface, while the flush water was released from the RO cells directly into the ocean. By this mechanism Cole et al. claimed to increase membrane life by pre-filtering the salt water applied against the membranes, and by increasing the flushing rate. What was not overcome was the requirement of proximity to a deep body of salt water, and difficulty in replacing the RO cells.

The requirement of proximity to a deep body of salt water was addressed in U.S. Pat. No. 4,125,463 to Chenoweth, which is incorporated by reference herein in its entirety. The Chenoweth patent describes placement of numerous reverse a osmosis (RO) units inside a well or other subterranean cavity for the purpose of producing fresh water from salt water. The Chenoweth invention is similar to that of Cole et al. in that salt water is passed from the surface to an RO unit below such that the hydrostatic head above the RO unit provides the pressure needed to operate the RO membrane, and adequate flushing is ensured by directing water from one end to the other through the housings of the RO units. The Chenoweth RO unit is merely subterranean (below ground) while the Cole et al. unit is submerged (below the surface of the water). This improvement, however, was still insufficient and was never commercialized. The threshold problem that still impedes commercialization in this area is the difficulty of servicing and replacing the RO units at great depths below the surface.

Thus, there exists a continuing need for apparatus and methods to cost effectively purify liquids through reverse osmosis.

SUMMARY OF THE INVENTION

In the present invention, a plurality of reverse osmosis units each having a cavity and a membrane are placed within a channel. The channel contains an unpurified liquid, and the membranes communicate directly with the unpurified liquid in the channel. The level of unpurified liquid is such that the differential pressure across the membranes is sufficient to cause purified liquid to accumulate in the cavities, from which it is emptied and pumped to the surface. The high pressure sides of the membranes are flushed by unpurified liquid being pumped through the channel. In this manner, a relatively large percentage of the channel diameter can be utilized, and the mechanisms can be implied over prior systems in which unpurified and purified liquids are piped from one reverse osmosis unit to another.

BRIEF DESCRIPTION OF THE DRAWINGS

Various objects, features, aspects and advantages of the present invention will become more apparent from the following detailed description, in conjunction with the accompanying drawings, wherein like numerals represent like components.

DETAILED DESCRIPTION

Figure 1:
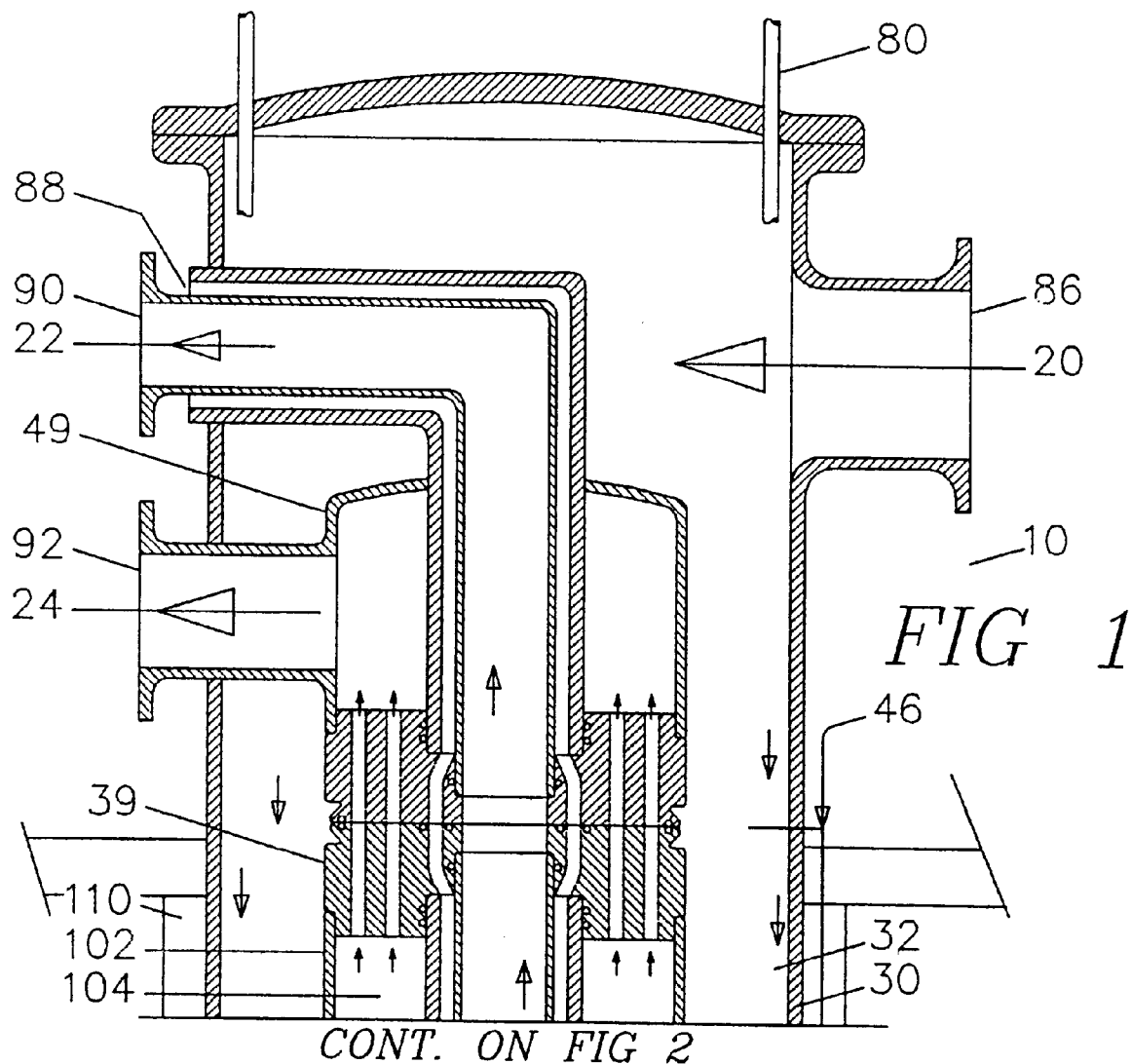
FIG. 1 is a sectional view of a desalinization plant head works according to the present invention.

Referring in general to FIGS. 1, 2, 3 and 4 the present invention 10 is generally referenced on the drawings and contains a shaft casing 30. Outside of shaft casing 30 is shaft seal or earth 110. Inside shaft casing 30 is raw liquid supply space 32 which communicates raw liquid 20 down to bottom of shaft casing 30. Raw liquid 20 is introduced into the invention 10 through raw liquid inlet 86 and transits down through raw liquid supply space 32. Modular filter unit 45 is comprised of a top modular endplate 72, a lower module endplate 78, modular outmost pipe 76, modular intermediate pipe 74, reverse osmosis membrane assembly 50, perforated pressure pipe 60, and a permeate discharge pipe 66, raw liquid 20 enters each modular filter unit 45 at lower modular endplate 78. Raw liquid 20 enters lower modular endplate 78 through raw liquid conduit 64. The raw liquid 20 then comes in contact with reverse osmosis membrane assembly 50. Osmonic pressure forces permeate 22 through membrane units attached to perforated pressure pipe 60 and collects in permeate accumulation space 62. Permeate accumulation space 62 communicates permate 22 up or down to permeate accumulation chamber 70. Permeate discharge pump 68 is located inside permeate accumulation chamber 70. Permeate discharge pump 68 pumps permeate 22 to the surface through permeate discharge pipe 66. Permeate discharge pipe 66 exits through permeate discharge 90. Brine 24 accumulates at the top of reverse osmosis membrane assembly 50 and exits each module filter unit 45 through brine discharge conduit 43. Brine dicharge conduit 43 transits brine 24 to brine discharge space 100. Brine discharge space 100 transits brine 24 to modular transit units 46. Modular transit units 46 consists of modular transit endplates 39 on top and bottom connected by transit pipe 102. Non perforated pressure pipe 94 is inside transit pipe 102 forming brine transit space 104. Permeate discharge pipe 66 is inside non perforated pressure pipe 94 forming permeate accumulation space 62 up to filtered air vent 88. Modular transit units 46 transit brine 24 to brine discharge accumulator 49. Brine discharge accumulator 49 transits brine 24 out the invention through brine discharge 92. Invention 10 is serviced by overhead crane 81. Overhead crane 81 has suspension cable 80 to facilitate assembly, installation and service in proper buoyancy. Buoyancy compensator 82 maintains invention buoyancy. Invention 10 is kept in alignment with shaft casing 30 by alignment brace 96. Conduit plug 84 may be used to eleminate raw liquid 20 flow into the permeate accumulation space 70.

In this arrangement, new raw liquid 20 is pumped downward through raw liquid supply space 32 and upward between reverse osmosis membrane assembly 50. While passing between membrane assembly 50 the salt water presses against the membrane assembly 50 forcing permeate 22 to pass through to permeate accumulation space 62 and thence to permeate accumulation chamber 70. The permeate is pumped to the surface by permeate discharge pump 68. In the meantime, the increasingly salty brine is moving upward flushing the membrane assembly 50 and enters brine discharge space 100. Brine 24 eventually exits the invention through brine discharge 92.

Figure 5:
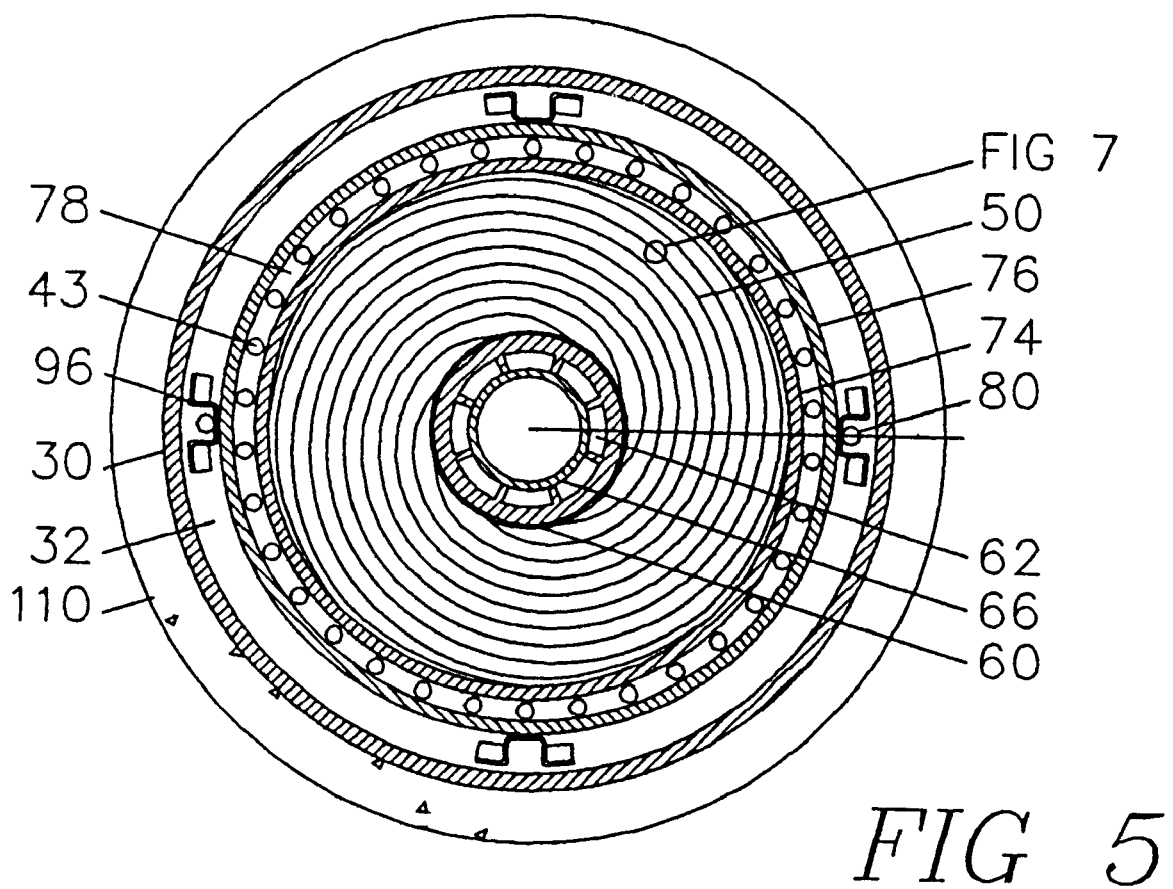
FIG. 5 is a cross sectional view of a modular filter unit of the desalinization plant of FIG. 3.
Figure 6:
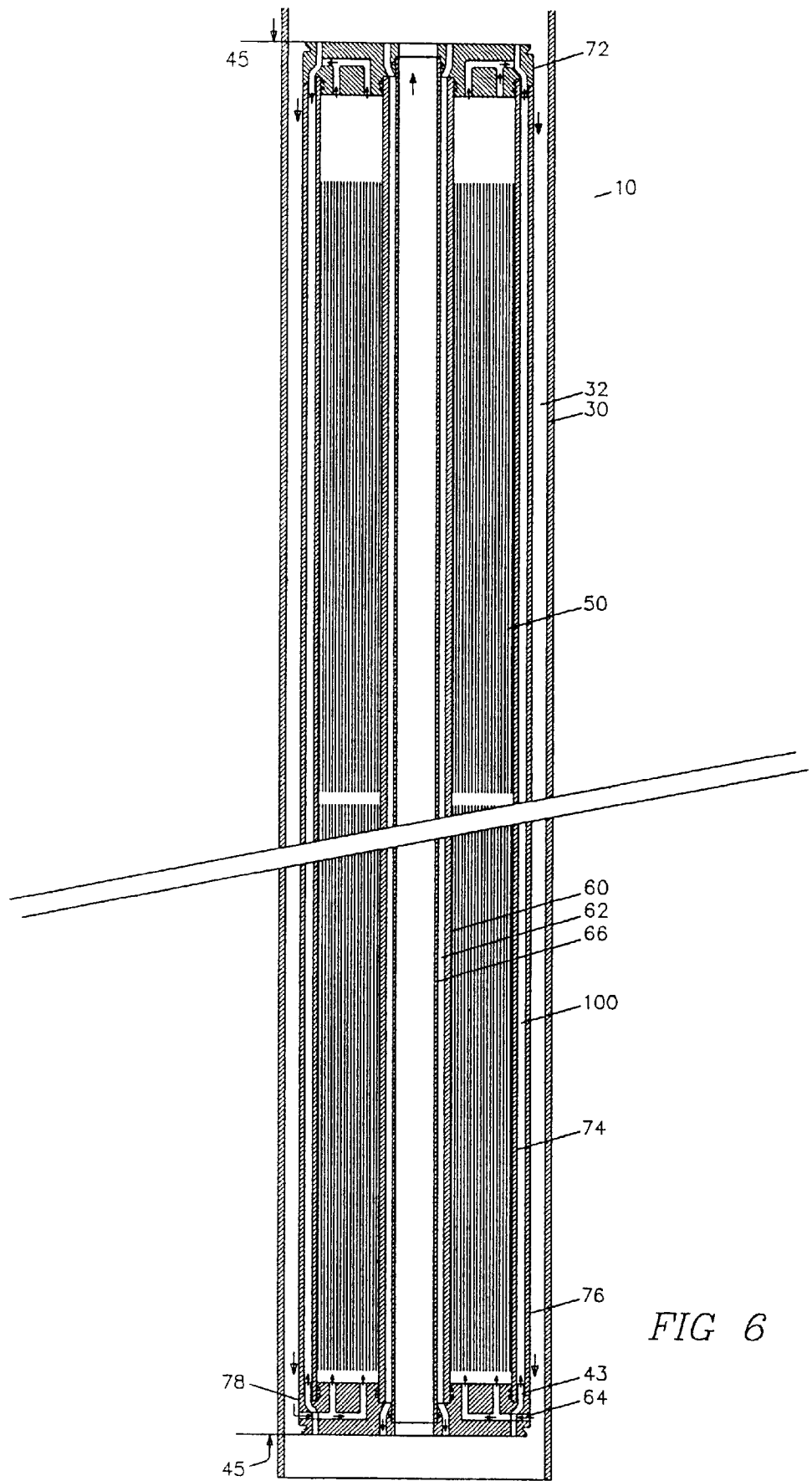
FIG. 6 is a sectional view of a single modular filter unit of the desalinization plant of FIGS. 2 and 3.
Figure 7:
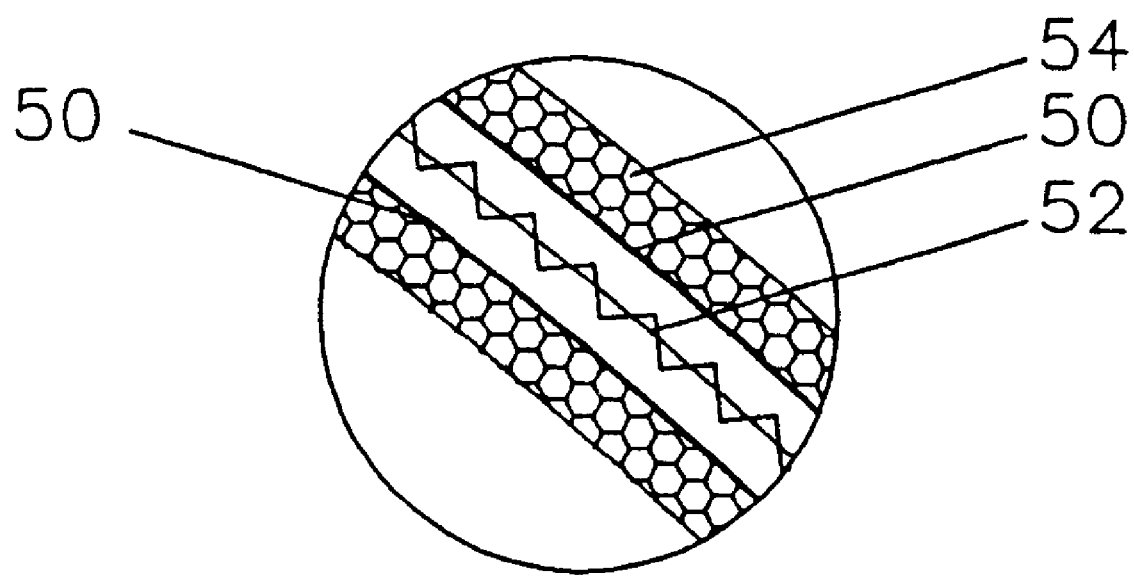
FIG. 7 is a blow up detail of a RO filter envelope of the desalinization plant of FIG. 1.
Figure 8:
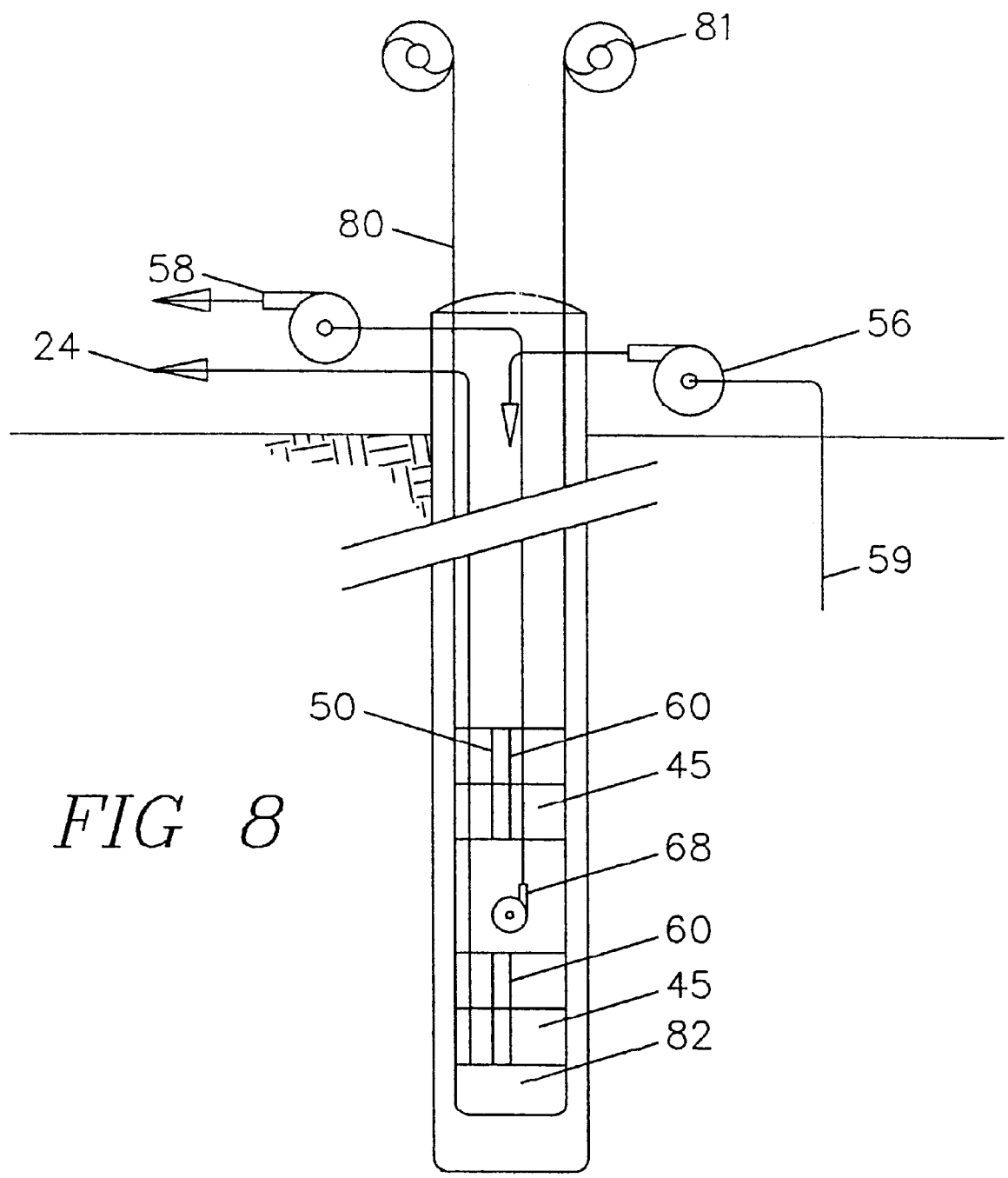
FIG. 8 is a block diagram of the desalinization plant of FIGS. 1 through 4.

Referring in general to FIGS. 5, 6, and 7 the present invention 10 is generally referenced on the drawings and FIG. 5 is a cross sectional view of a modular filter unit of the desalinization plant. Many of the parts of FIGS. 5, 6, and 7, have already been discussed in the detailed description and FIG. 7 will introduce a blowup detail of a complete membrane assembly 50. Porous permeate carrier 52 will transfer permeate 22 to perforated pressure pipe 60. Feed water and brine spacer 54 is used to separate reverse osmosis membrane assembly 50 and allow feed water and brine reject to pass through the modular filter unit 45 then into brine discharge space 100.

Discussing FIGS. 1, 2, 3, 4, 5 and 6 in greater detail, shaft casing 30 may or may not have been constructed specifically for the purpose of reverse osmosis. Abandoned water or oil wells may be used as herein described, and even wells which contain oils or other fluids. It is desirable for the well to have a usable inner diameter of at least 6 inches, although wells having smaller diameters can also be used. The shaft casing 30 of the well is not especially important, and suitable wells may have the conventional steel, cast iron, concrete or other casings, or they may have no casing at all. In many instances a well employed according to the present invention may be located near the ocean or other salty or brackish body of water to provide a convenient source of water. In such cases the well can descend from a point in the body of water or from a point on the land. In other instances an appropriate well may be utilized which is many miles from a source of water. Appropriate wells may even be inclined rather than vertically oriented. In short, systems as herein described may be utilized in conjunction with many different types of wells, regardless of their original purpose, shape, orientation, and location.

This present invention will also be suitable to include other levels of product filtration. Reverse osmosis (hyperfiltration) is the ultimate level of filtration that may be achieved with current membrane technology. Future membrane developments may increase this inventions range of filtration beyond Hyperfiltration to include hydrogen and oxygen seperation. Other levels of filtration that should be addressed and can be achieved with this present invention include particle filtration, microfiltration, ultrafiltration, and nanofiltration. Therefore this present invention may be configured to filter macro particles (100 to 1000 Micrometers), micro particles (1.0 to 100 Micrometers), macro molecular particles (0.1 to 1.0 Micrometers), molecular particles (0.001 to 0.1 Micrometers) and ionic particles (less than 0.001 to 0.001 micrometers).

Depending on the embodiment, the terms "well" and "channel" may or may not be coincident. As used herein, the term "well" is used according to its ordinary dictionary definition to mean a deep hole in the ground through which a liquid is transported. In contrast, the term channel means a relatively linear duct through which the unpurified liquid flows past the membranes. Thus, in some embodiments the channel may be the same thing as the well, while in other embodiments the channel may reside within the well.

It is possible to have may different types of channels. In FIGS. 1, 2, 3, and 4, the channel is not the entire well, but only shaft casing 30. In the Chenoweth patent, the channel is the annular space (9) because the complex piping system through which the unpurified liquid flows past the membranes too complex to be considered a relatively linear duct. On the other extreme, an ocean, bay, lake or other large body of water cannot be considered a channel as the term is used herein because water used to flush the membranes would disperse in all directions rather than in a relatively linear manner.

There are many possible embodiments of shaft 30, pipe 76 and pipe 74. Such shafts or pipes are preferably constructed of plastic or other lightweight pipe such as PVC or fiberglass, but they may be constructed of steel or other heavy material as well. Shaft 30, pipe 76 and pipe 74 need not have an especially strong burst pressure or collapse pressures since they will have approximately equal internal and external pressures. In this respect, the pipe 76 may lie close against the inner wall of the shaft casing 30, or there may be a liquid filled space between pipe 76 and the inner wall of shaft casing 30. Shaft casing 30 is preferably installed in 20 to 40 foot sections for convenient handling and shipping, and the sections may be connected to each other using techniques previously known to those in the well drilling industry. Modular filter unit 45 is preferably installed in 5 to 20 foot sections for convenient handling and shipping. In an alternative embodiment transit pipe 102, pressure pipe 94, and pipe 66 may comprise long flexible tubes which can be rolled onto a drum of sufficient diameter. It is also not necessary that shaft 30 and pipe 76 or pipe 102 be concentric, or that they contain multiple or circumferentially positioned passageways.

With respect to the membrane assembly 50, the preferred configuration is vane-shaped envelopes as shown. The vane shape has several advantages, including increased surface area and flexibility relative to the perforated pressure pipe 60. In preferred embodiments each of the reverse osmosis membrane envelopes is coupled to perforated pressure pipe 60. There are numerous materials from which the membranes may be constructed, including cellulose acetate and newer very thin membranes. Other newer materials may be used as well, including cellulose esters, polyethylene, polyvinyl chloride, polyvinylidene, chloride-polyvinyl chloride and others.

Different membranes operate at different differential pressures, and would therefore require different minimum depths to become operational. For example raw fresh water would require operating pressures of only 40 psi, brackish water will require greater pressures of around 200 psi minimum, and seawater will require pressures exceeding 600 psi at present membrane technology. Osmotic pressures will change as membrane technology is improved. It would also be possible to reduce the depth of the channel somewhat by pressurizing the channel. Of course, to the extent that pressurizing the channel involved additional costs, it would be more cost effective to provide a deeper channel. With present technology, it is contemplated that a channel according to the present invention would need to contain salt water to a depth of at least 2000 feet to be cost effective, and other liquids such as orange juice to a depth of at least 100 feet. Assuming atmospheric pressure above the channel, this would correspond to pressures at the external surfaces of the membranes from at least 40 to 600 psi.

Figure 2:
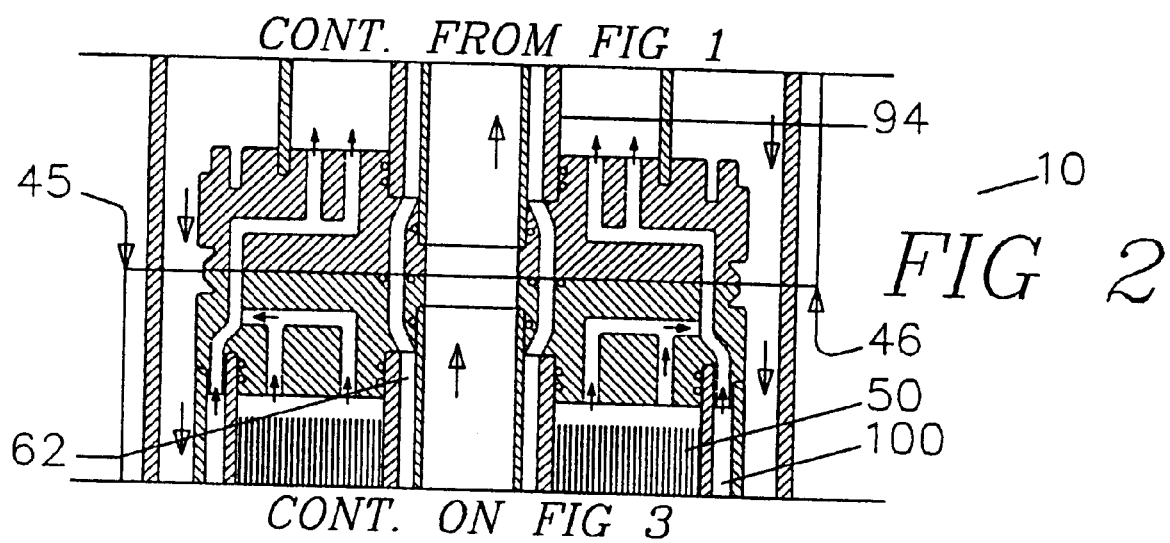
FIG. 2 is a sectional view of the continuation of the desalinization plant of FIG. 1.
Figure 3:
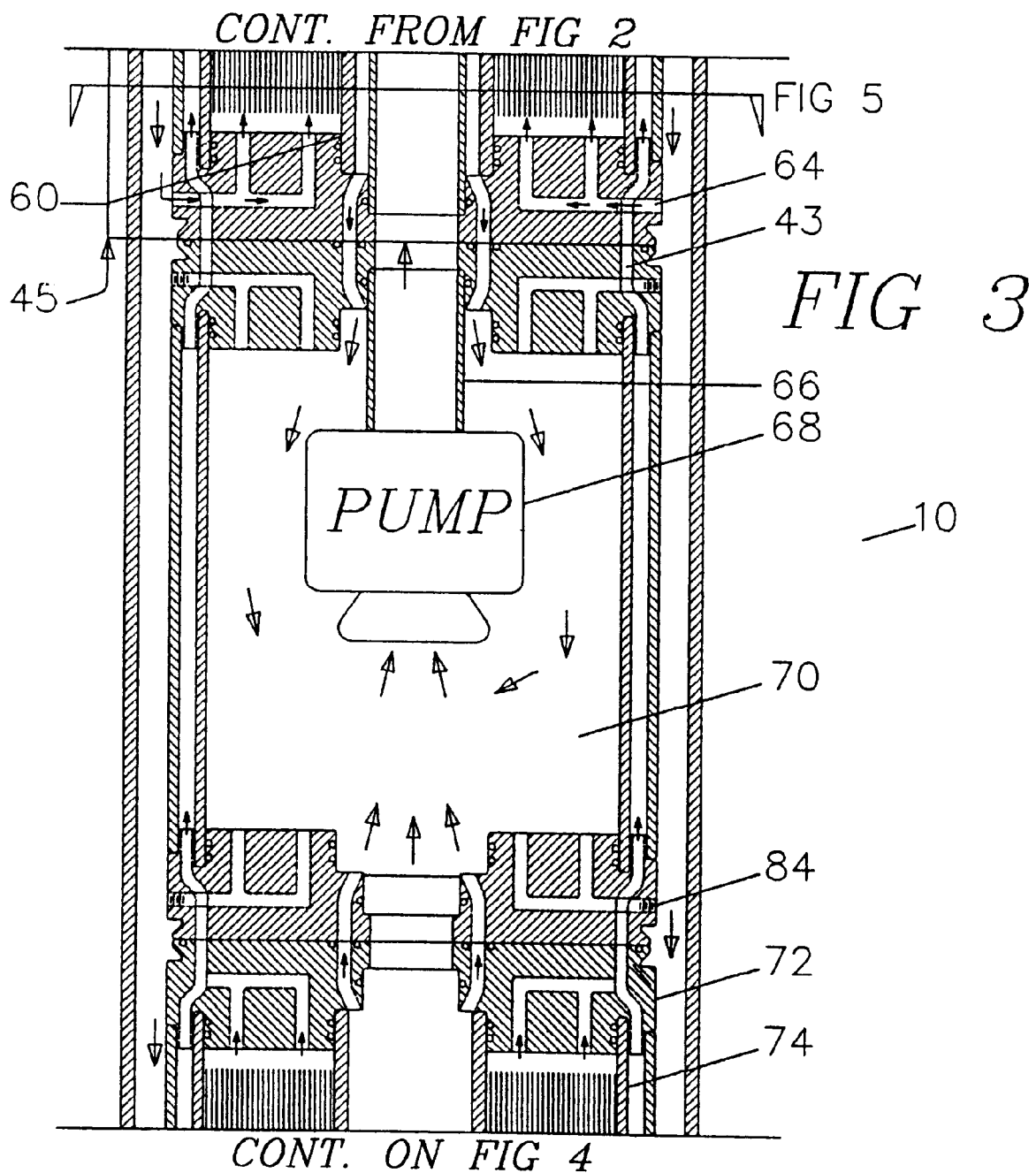
FIG. 3 is a sectional view of the continuation of the desalinization plant of FIG. 2.
Figure 4:
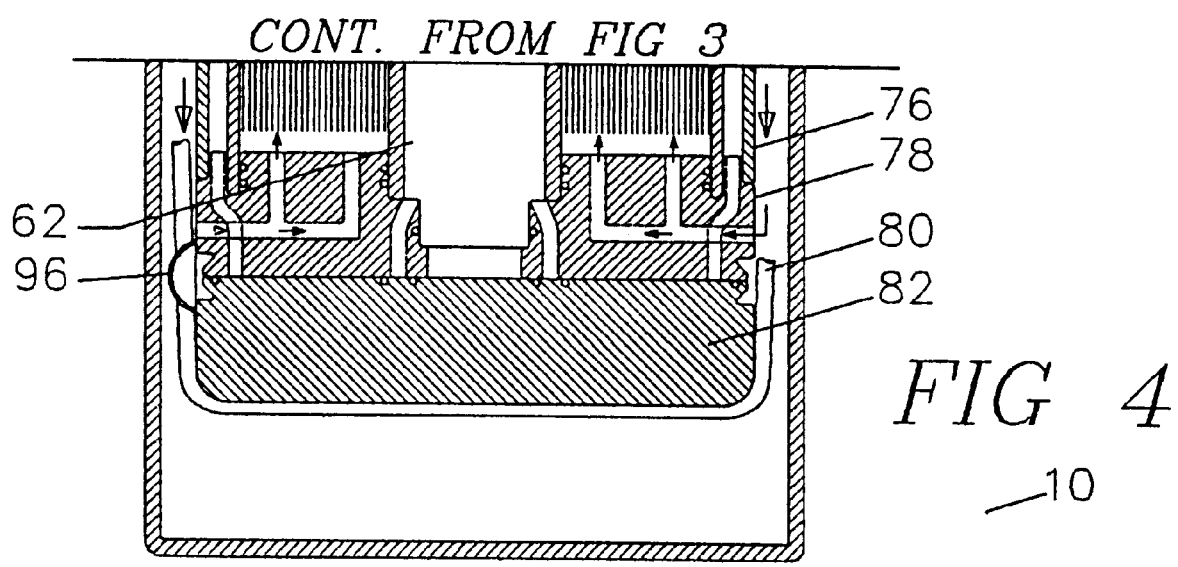
FIG. 4 is a sectional view of the continuation of the desalinization plant of FIG. 3.

It is contemplated that the porous permeate carrier 52 can be emptied in a number of different ways. Purified liquid could drain down to one or more collection points as in the Cole patent, or it could be pumped or suctioned laterally or upwards as depicted in FIGS. 2, 3, and 4 herein.

Of course, it should be recognized that embodiments as herein described need not completely purify a liquid of interest. For example, various embodiments may be used to desalt brackish water from about 5000 ppm of salt down to about 50 ppm, while other embodiments desalt the same water down to about 500 ppm. Other ranges may be applicable to other removable particulates. To clarify matters, unless the context clearly indicates some other meaning, the terms "purify" and "purifying" are used herein to include both complete purification and incomplete purification, and the term "liquid" includes flowable compositions whether solutions, colloids or suspensions, and whether or not they contain water. Moreover, to further clarify matters, the terms "particle", "particles" and "particulate" are used herein to refer to any entity removable from a liquid by filtration, and specifically includes salts, heavy metal ions, and other chemical and biological contaminants.

Pumps 56 and 58 are previously known. The flow path(s) can also be modified. With respect to FIGS. 1 through 4, for example, new raw liquid 20 can flow down space 32 and up brine discharge space 100 as shown to brine discharge space 104, or in the reverse direction up space 32 and down space 100. Similarly, it is not necessary to pump permeate below the surface at all. Instead permeate in permeate discharge pipe 66 can be pumped up from approximately 60 feet by a pump located at or near the surface, with additional permeate being replenished from below.

While not explicitly shown, it is anticipated that raw liquid 20 passing into raw liquid supply space 32 will be pre-filtered. Pre-filtering may occur through supply or intake well 59 at any point upstream of the new raw liquid 20 passing through pump 56. The ability to filter the new salt water prior to its entering the channel and coming into contact with the membranes is considered to be relatively important in terms of long-term protection of the membranes. It is this perceived need to pre-filter that renders the present embodiments superior to that of merely placing the membranes in the open ocean, and either relying upon the natural water currents or pumping water past the membranes to achieve adequate flushing.

In FIGS. 1 through 4, raw liquid supply space 32 contains raw liquid 20 filled to the top of raw liquid inlet 86. Raw liquid inlet 86 is by design physically higher than brine discharge 92 thereby creating a natural pressure differential for flow between inlet 86 and discharge 92. A pressure differential may also be created or increased by pump 56 to cause raw liquid 20 flow from inlet 86 to discharge 92. The flow of raw liquid 20 across membrand assembly 50 flushes the surfaces of membrane assembly 50. Upon discharge from membrane assembly 50 raw liquid is considered to be brine 24 and is discharged through brine discharge 92.

One of the advantages of the present invention is that portions or all of transit pipe 102 can be flexible and separate from from non perforated pressure pipe 94. Another advantage of the present invention is that portions or all of permeate discharge pipe 66 can be flexible and separate from from non perforated pressure pipe 94 and transit pipe 102. For example, the portion of permeate discharge pipe 66 at least above pump 68, can be as flexible as an ordinary fire hose since it need not support much weight, and the inner and out pressures on the line would be substantially the same. It may be desirable to support the pipe 102 and pipe 66 with a steel or other strong cable removably coupled to suspension cable 80 at required intervals.

It should be apparent to those skilled in the art that embodiments of the present invention addresses the threshold problem mentioned above of servicing and replacing the RO units at great depths below the surface. In comparison with systems such as that advocated by Chenoweth or Cole, the systems described herein can be raised or lowered with considerable ease. In the invention discribed in FIGS. 1 through 4 for example, all of the membranes can be accessed by merely raising the suspended parts of invention 10, with suspension cable 80, from overhead crane 81, while leaving shaft casing 30 in place. The simplicity of construction is such that instead of bolting together dozens or hundreds of different piping connections between RO units (as in Chenoweth), all of the connections are automatically made as an intergal part of top and bottom endplates of the modular transit units 46 and modular filter units 45. The present invention of FIGS. 1 through 4 is even simpler to construct, install and service than any previous invention of this type.

Thus, while specific embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A system for purifying a particulate containing liquid disposed within a channel, the system comprising:

a plurality of membranes disposed within the channel in membrane units, the membranes substantially permeable to the liquid and substantially impermeable to the particles within a working pressure range, the membranes each having a high pressure side at least partially disposed within the channel, and a low pressure side in contact with a common permeate accumulation chamber such that a purified liquid passes across the membranes into the chamber;

a discharge conduit distinct from the channel and coupling the membrane units;

a permeate passageway coupling the membrane units; and a first pump fluidly coupled to the chamber to lift at least some of the purified liquid upwards.

2. The system of claim 1 further comprising a second pump which pumps the liquid in the channel in a direction opposite to flow of the permeate.

3. The system of claim 1 further comprising the first pump disposed within the chamber.

4. The system of claim 1 further comprising the first pump disposed within the chamber between two of the membrane units.

5. The system of any of claims 1, 3 or 4 wherein at least a portion of the first passageway is flexible.

6. The system of any of claims 1, 3 or 4 wherein the first pump is submerged within the purified liquid.

7. The system of any of claims 1, 3 or 4 wherein the channel is at least 50 feet deep.

8. A reverse osmosis apparatus for use in filtering a feed liquid, comprising:

a channel containing the liquid to a depth of at least 50 feet such that portions of the feed liquid at different positions within the channel are under different pressures;

a plurality of membranes disposed in membrane units, each of the membranes having a first surface in fluid contact with the feed liquid, a second surface fluidly coupled with a permeate accumulation space, the membranes positioned within the channel such that a differential pressure exists across the membranes sufficient to force at least some of the feed liquid across the membranes and into the permeate accumulation space, and thereby separate a permeate from a flow-by liquid;

a first passageway which transports portions of the feed liquid between positions within the channel having differential pressures of at least 40 psi;

a second passageway which couples the membrane units and transports the permeate across a differential pressure of at least 40 psi; and a third passageway which couples the membrane units and transports the flow-by liquid.

9. The apparatus of claim 8 wherein the first passageway is defined by a structure which is concentric about the second passageway.

10. The apparatus of claim 8 wherein the second passageway is defined by a structure which contains an additional passageway for raising the flow-by liquid.

11. The apparatus of claim 8 wherein each of the membranes extends radially from a structure defining the second passageway.

12. The apparatus of claim 8 wherein at least part of the second passageway comprises a flexible tube.

13. The apparatus of any one of claims 8–12 further comprising a submerged pump fluidly coupled to the second passageway.

14. A method of purifying a feed liquid comprising:

pumping a portion of the feed liquid into a channel;

providing a plurality of membranes in membrane units, each of which said membranes is semi-permeable to the feed liquid, and each of which is fluidly coupled to a permeate collection space;

positioning the membrane units in the channel at different depths where there is a pressure differential across the membranes sufficient to operate the membranes to produce a purified substance in the permeate collection space;

flushing the exterior of the membranes with liquid from the channel;

transporting the purified substance in a purified substance conduit that couples the modules; and transporting the flushing liquid in a flushing liquid conduit that couples the membrane units.

15. The method of claim 14 further comprising pumping the purified substance upward within a structure contained within the permeate collection space.

16. The method of claim 15 wherein the step of positioning the membranes comprises mounting the membranes in said membrane units radially with respect to the structure.

17. The method of claim 14 further comprising pumping the purified substance upward using a submerged pump.

* * * * *